Figure 1:
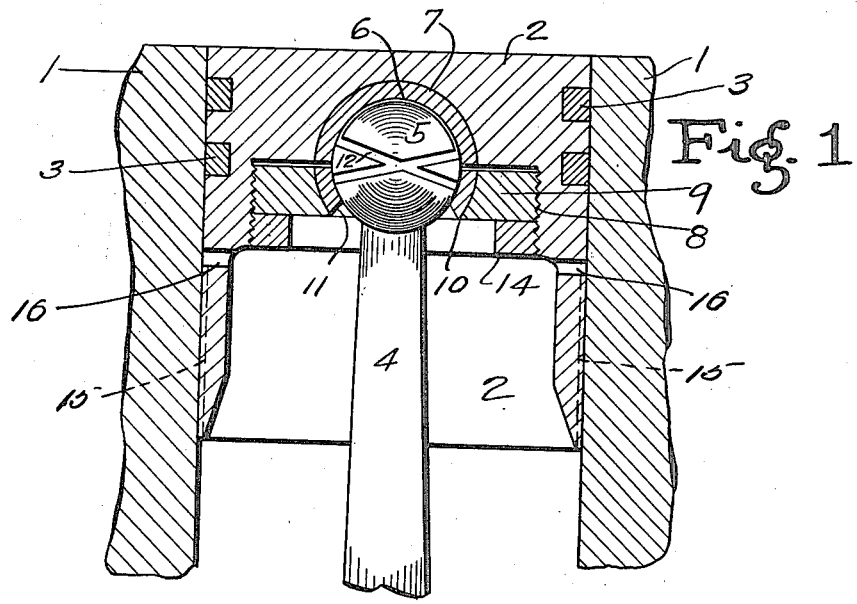

J. A. ROSE.
BALL JOINTED PISTON.
APPLICATION FILED JAN. 11, 1918.

1,294,538.

Patented Feb. 18, 1919.

Inventor:
James A. Rose
By John C. Higdon
His Attorney

UNITED STATES PATENT OFFICE.

JAMES A. ROSE, OF ST. LOUIS, MISSOURI.

BALL-JOINTED PISTON.

1,294,538. Specification of Letters Patent. Patented Feb. 18, 1919.

Application filed January 11, 1918. Serial No. 211,352.

*To all whom it may concern:*

Be it known that I, JAMES A. ROSE, a citizen of the United States, residing at St. Louis, in the State of Missouri, have invented certain new and useful Improvements in Ball-Jointed Pistons, of which the following is a specification containing a full, clear, and exact description, reference being had to the accompanying drawings, forming a part hereof.

My invention relates to an improved means for connecting the end of a connecting-rod to a piston, and it consists in the novel disclosure hereinafter fully described and particularly pointed out in the claims found at the end of this specification.

The object of my invention is to provide a universal-joint between the piston-end of the connecting-rod and the piston, where the piston will be free to rock or rotate (as well as to reciprocate) within the cylinder, and thus enable the piston and cylinder to wear "round" at all times, preventing all scoring and irregular wear of the cylinder walls, as well as obviating the necessity of reboring the cylinders.

Figure 2:
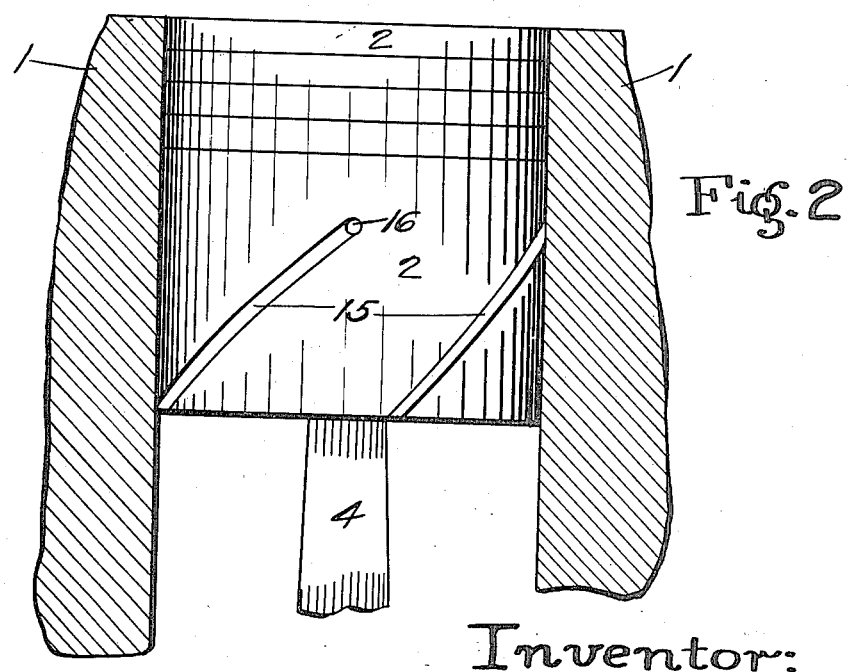

In the drawings,

Figure 1 is a vertical section of a portion of the cylinder of an automobile gasolene motor, or it may be of a steam-engine, air-pump, or of a pump for liquid or gas of any kind, having my improved ball-jointed piston located therein, and Fig. 2 is a similar view of a part of a cylinder, having my ball-jointed piston located therein, and shown in elevation.

The numeral 1 designates any common cylinder of an automobile gasolene-motor, a steam-engine, or a pump, and the numeral 2 designates the piston in said cylinder, and fitted with the usual packing-rings 3.

The numeral 4 designates the connecting rod, which I provide with a ball 5 at its piston end, and said ball is loosely seated in a semi-spherical bearing 6 located in a socket 7 formed in the inner wall of the head of said piston. Said bearing 6 should, of course be made of bronze or other efficient bearing metal.

The inner walls of the piston are thickened and screw-threaded at a point adjacent the head of the piston, as designated by the numeral 8.

A clamping-nut 9, threaded upon its outer edge is screwed into the said threaded portion of said piston, the said nut having a circular central opening 10 formed therein and fitted with a bearing of bronze or other metal 11.

The said bearing 11 fits the contour of the said ball 5, of course, so that it will form an efficient joint with said ball, and permit the bearing to rock or rotate on said ball, as well as permit said ball to rock loosely within said bearing during the operation of the engine or pump.

Common oil-grooves 12 are formed in the outer surface of said ball, to carry the oil that is "splashed" from the crank-case (not shown) up into the interior of the piston, to the various portions of the said bearings 6 and 11.

A lock-nut or ring 14 is provided with screw-threads upon its outer edge, which engage the said threaded portion 8 of said piston, to securely lock the said clamping-nut 9 in position after it has been moved to adjust the bearing 11, thereby securely confining the ball 5 of the connecting-rod in its said bearings, and yet permitting it to be relatively rocked or rotated in said bearings, and permitting said piston to rock or rotate (as well as reciprocate) in the said cylinder.

A series of spiral oil-grooves 15 are cut in the outer wall of the said piston 2, beginning at the lower end of said wall and extending upwardly about half the length of the piston, and terminating at apertures or oil-holes 16 thereat, the said oil-holes opening upon the interior of the piston, and connecting the same with the said spiral-grooves, so that as the piston moves up and down in the cylinder the said spiral grooves will intercept the oil, and act as screw-threads in rocking or rotating the piston a slight distance at each stroke; thereby preventing scoring of the piston and cylinder, which has commonly occurred heretofore in all such cases where the piston was not provided with any means for allowing it to rotate or rock in the cylinder, The operation of my invention will be readily apparent without further description.

I claim:

1. A piston and connecting-rod united by a universal-joint at the piston-end of said rod, so that said piston may rock or rotate as well as reciprocate; said piston having means thereon so arranged as to exert force to cause same to rock or rotate while reciprocating in its cylinder, 2. A piston and connecting-rod united by a ball-joint at the piston-end of said rod, spiral-grooves formed in the outer wall of said piston to intercept the oil and impart a rocking or rotating movement to the piston during its reciprocation in its cylinder, and so prevent possible scoring of the cylinder and piston walls.

3. A piston and connecting-rod united by a ball-joint at the piston-end of said rod, said piston having spiral grooves in its outer wall, and said grooves terminating at their upper ends in oil ducts which lead to the interior of said piston.

In testimony whereof I have signed my name to this specification in presence of two subscribing witnesses.

JAMES A. ROSE.

Witnesses:
  FRANCES HOOVER ROSENBAUM,
  JOHN C. HIGDON.